E. L. ALBRO.
COOKING UTENSIL.
APPLICATION FILED APR. 4, 1916.
1,254,384.
Patented Jan. 22, 1918.
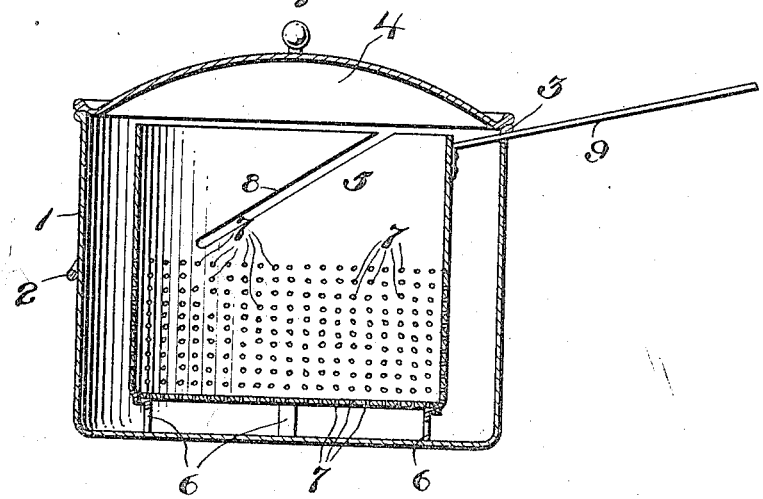
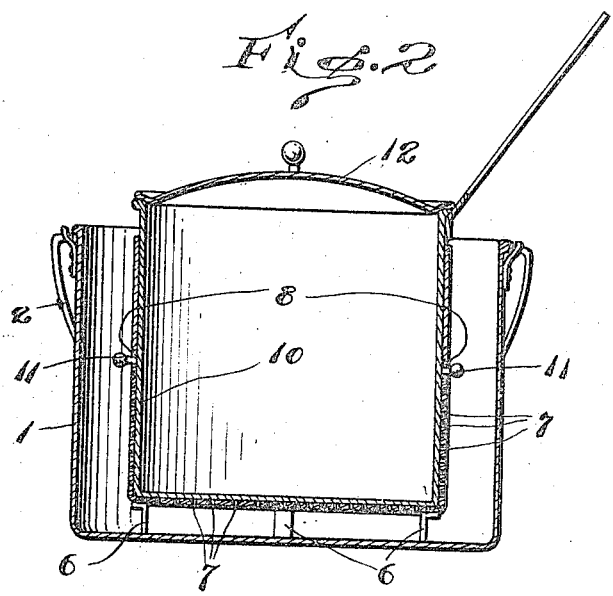
WITNESSES
INVENTOR
Emma L. Albro
BY
ATTORNEY United States Patent Office.

EMMA L. ALBRO, OF NICHOLS, NEW YORK.

COOKING UTENSIL.

1,254,384.  Specification of Letters Patent.  Patented Jan. 22, 1918.

Application filed April 4, 1916. Serial No. 88,908.

*To all whom it may concern:*

Be it known that I, EMMA L. ALBRO, a citizen of the United States, residing at Nichols, in the county of Tioga and State of New York, have invented certain new and useful Improvements in Cooking Utensils, of which the following is a specification.

This invention has relation to cooking utensils and the nature and objects thereof will be readily apparent to those skilled in the art to which it appertains, in the light of the following explanation of the accompanying drawings, illustrating what I now believe to be the preferred embodiment, or mechanical expression, of my invention, from among other forms and arrangements within the spirit of the invention, and the scope of the appended claim.

However, an object of the invention is to provide a cooking utensil comprising inner and outer containers, whereby food may be cooked within the inner container by water which circulates through both containers.

Another object of the invention is to provide a cooking utensil wherein the inner container may be employed as a means for subsequently comminuting the food cooked therein, in a novel manner.

Another object of the invention is to provide in a utensil of the character described a third container adapted for disposition within the first container to perform the functions of a double boiler.

In addition to the foregoing my invention comprehends improvements in the details of construction and arrangement of parts to be hereinafter described and particularly pointed out in the appended claim.

In the accompanying drawings in which similar and corresponding parts are designated by the same characters of reference throughout the several views in which they appear Figure 1, is a vertical section through my utensil illustrating the combination of containers used for boiling vegetables or the like, Fig. 2, is a similar view illustrating the combination of containers used as a double boiler.

With reference to the drawings 1 indicates an outer container, having a bail 2, and is to all intents and purposes similar to the ordinary type of kettle except for the provision of a recess 3 in its upper edge. A closure 4 of the usual type may be provided therefor.

An inner container 5 is provided for disposition within the kettle 1, and having supporting legs 6 for spacing its bottom away from the outer container. The container 5 is perforated as at 7, or if desired may be formed of foraminous material. The walls of the container 5 are provided at opposite sides with upwardly inclined slots 8 extending to approximately one half the height of the container, and a handle 9 is provided for said container and is adapted to be seated within the recess 3 of the outer container.

When cooking vegetables, such as potatoes for instance they are placed within the container 5, which has previously been placed within the outer container, and the requisite amount of water placed therein. When the potatoes have been thoroughly cooked the inner container is lifted, whereupon the vegetables are drained. The outer container is then emptied of water and the inner container again placed therein. For mashing the potatoes, a third container 10 is provided for engagement within the container 5, and is provided at opposite sides with trunnions 11 which seat in the slots 8 of the container 5. As the inner container 10 is pressed downward the vegetables are pressed through the openings 7 and thereby become finely comminuted.

With the container 10 seated in the container 5, it is evident that the combination of utensils thereby presented is available for use as a double boiler, and to that end a closure 12 is provided.

Thus it will be seen that I have provided a novel combination of utensils, which may be employed as a vegetable cooker, potato masher, double boiler, and various other uses which may suggest themselves to persons as they become familiar with their use.

While I have illustrated my invention with some degree of particularity, it is evident that other ways of constructing my utensil may occur to those skilled in the art to which it appertains, and I therefore reserve the right and privilege of changing the form of the details, and otherwise altering the arrangement of parts without departing from the spirit of the invention or the scope of the claim.

Having thus described my invention what

I claim as new and desire to secure by Letters Patent is:—

A cooking utensil comprising in combination an outer vessel, a second vessel therewithin in spaced relation thereto, having its bottom and lower half of its sides perforated, and a pair of oppositely disposed downwardly inclined slots formed in the upper portion of its sides to extend around the vessel in opposite directions, a third vessel snugly fitting the second, a pair of oppositely extending trunnions on the third vessel for engagement in the inclined slots of the second, and a handle for rotating the third vessel relative to the second whereby material disposed between the bottoms of the third and second vessels may be expressed through the perforations.

In testimony whereof I affix my signature in presence of two witnesses.

MRS. EMMA L. ALBRO.

Witnesses:
J. C. DUNHAM,
D. G. WHEELER.